(12) United States Patent
Singh et al.

(10) Patent No.: US 12,149,613 B2
(45) Date of Patent: Nov. 19, 2024

(54) DATA VALIDATION TECHNIQUES FOR SENSITIVE DATA MIGRATION ACROSS MULTIPLE PLATFORMS

(71) Applicant: EQUIFAX INC., Atlanta, GA (US)

(72) Inventors: Rohit Singh, Devon, GA (US); Pinaki Ghosh, Cumming, GA (US); Joji Varughese, Alpharetta, GA (US)

(73) Assignee: Equifax Inc., Atlanta, GA (US)

( * ) Notice: Subject to any disclaimer, the term of this patent is extended or adjusted under 35 U.S.C. 154(b) by 287 days.

(21) Appl. No.: 17/643,302

(22) Filed: Dec. 8, 2021

(65) Prior Publication Data
US 2023/0179401 A1 Jun. 8, 2023

(51) Int. Cl.
H04L 9/08 (2006.01)
H04L 9/06 (2006.01)
H04L 67/06 (2022.01)
H04L 67/1097 (2022.01)

(52) U.S. Cl.
CPC .......... *H04L 9/0825* (2013.01); *H04L 9/0643* (2013.01); *H04L 67/06* (2013.01); *H04L 67/1097* (2013.01)

(58) Field of Classification Search
CPC . H04L 9/0825; H04L 9/0643; H04L 67/1097; H04L 67/06
See application file for complete search history.

(56) References Cited

U.S. PATENT DOCUMENTS

| | | | | |
|---|---|---|---|---|
| 7,373,643 | B2 * | 5/2008 | Radatti | G06F 21/564 |
| | | | | 717/169 |
| 10,896,209 | B1 * | 1/2021 | Concannon | G06F 16/258 |
| 11,120,047 | B1 * | 9/2021 | Hoffmann | G06F 16/2358 |
| 2007/0186127 | A1 * | 8/2007 | Desai | G06F 11/1448 |
| | | | | 714/13 |
| 2015/0026136 | A1 * | 1/2015 | Rathod | G06F 16/122 |
| | | | | 707/692 |
| 2017/0270175 | A1 * | 9/2017 | Bantupalli | G06F 16/273 |
| 2018/0219836 | A1 * | 8/2018 | Peterson | H04L 67/1097 |

(Continued)

FOREIGN PATENT DOCUMENTS

| | | | | |
|---|---|---|---|---|
| CN | 109409122 B | * | 8/2022 | G06F 21/6227 |
| EP | 3096258 A1 | * | 11/2016 | G06F 16/285 |

(Continued)

OTHER PUBLICATIONS

PCT/US2022/078550, "International Search Report and Written Opinion", Jan. 16, 2023, 12 pages.

*Primary Examiner* — Shean Tokuta
(74) *Attorney, Agent, or Firm* — Kilpatrick Townsend & Stockton LLP (57) ABSTRACT

Techniques for validating large amounts of sensitive data migrated across multiple platforms without revealing the content of the sensitive data are provided. For example, a processing device can transform data in a first data file stored on a first platform to common data formats. The processing device can generate a first set of hash values. The processing device can receive a second set of hash values for a second data file stored on a second platform. The processing device can compare the first set of hash values and the second set of hash values and cause the first data file or the second data file to be modified based on a difference between the sets of hash values.

19 Claims, 7 Drawing Sheets

(56) References Cited

U.S. PATENT DOCUMENTS

| | | | | |
|---|---|---|---|---|
| 2019/0205429 | A1* | 7/2019 | Lee | G06F 16/214 |
| 2020/0273031 | A1* | 8/2020 | Narayan | G06Q 20/3827 |
| 2021/0279248 | A1 | 9/2021 | Gandhi et al. | |
| 2021/0326359 | A1* | 10/2021 | Upton | G06F 3/065 |
| 2023/0179401 | A1* | 6/2023 | Singh | G06F 21/6227 |
| | | | | 713/171 |
| 2024/0111747 | A1* | 4/2024 | Maitra | G06F 16/27 |

FOREIGN PATENT DOCUMENTS

| | | | | |
|---|---|---|---|---|
| WO | WO-2009154869 A2 * | 12/2009 | | G06F 16/00 |
| WO | WO-2016108983 A2 * | 7/2016 | | G06F 21/6245 |

* cited by examiner

DATA VALIDATION TECHNIQUES FOR SENSITIVE DATA MIGRATION ACROSS MULTIPLE PLATFORMS

TECHNICAL FIELD

The present disclosure relates generally to data validation for data migration across multiple platforms. More specifically, but not by way of limitation, this disclosure relates to secure validation of a large amount of sensitive data migrated across multiple platforms without revealing the content of the sensitive data.

BACKGROUND

Moving data from a first platform to a second platform may result in some of the data being lost or changed due to network errors or other types of errors. In some examples, the two platforms may have different formats or logic for representing and storing data. For example, the second platform may apply transformations on the source data, such as using a different encryption scheme, different security mechanisms, etc. To use a different decryption scheme, the source data may have to be de-tokenized or decrypted into clear text, then a new encryption scheme can be applied in order to store the transferred data on the second platform. Each change to the source data can introduce potential data errors. The data may be validated after being moved to the second platform to verify the accuracy and integrity of the data. In some examples, validating the transferred data may include comparing the unencrypted clear text of the source data and the transferred data side by side. But this may be time consuming for large data transfers, and in some examples the data may include sensitive data that should not be reviewed in clear text.

SUMMARY

Various aspects of the present disclosure provide systems and methods for securely validating a large amount of sensitive data migrated across multiple platforms without revealing the content of the sensitive data. In one example, a method includes transforming data in a first data file stored on a first platform to common data formats, the first data file comprising a first plurality of data records and each data record of the first plurality of data records comprising a plurality of attributes; identifying a first set of values of a primary key for the first plurality of data records; generating a first set of hash values, each hash value of the first set of hash values generated by applying a hash function on a data record of the first plurality of data records; receiving a second set of hash values for a second plurality of data records in a second data file stored on a second platform along with a second set of values of the primary key associated with the second set of hash values, each data record of the second plurality of data records comprising the plurality of attributes; comparing the first set of hash values and the second set of hash values according to the first set of values and the second set of values of the primary key; and causing the first data file stored on the first platform or the second data file stored on the second platform to be modified based on the first set of hash values being different from the second set of hash values.

In another example, a system includes a processing device and a memory device in which instructions executable by the processing device are stored for causing the processing device to perform operations. The operations include transforming data in a first data file stored on a first platform to common data formats, the first data file comprising a first plurality of data records and each data record of the first plurality of data records comprising a plurality of attributes; identifying a first set of values of a primary key for the first plurality of data records; generating a first set of hash values, each hash value of the first set of hash values generated by applying a hash function on a data record of the first plurality of data records; receiving a second set of hash values for a second plurality of data records in a second data file stored on a second platform along with a second set of values of the primary key associated with the second set of hash values, each data record of the second plurality of data records comprising the plurality of attributes; comparing the first set of hash values and the second set of hash values according to the first set of values and the second set of values of the primary key; and causing the first data file stored on the first platform or the second data file stored on the second platform to be modified based on the first set of hash values being different from the second set of hash values.

In yet another example, a non-transitory computer-readable storage medium having program code that is executable by a processor device to cause a computing device to perform operations. The operations include transforming data in a first data file stored on a first platform to common data formats, the first data file comprising a first plurality of data records and each data record of the first plurality of data records comprising a plurality of attributes; identifying a first set of values of a primary key for the first plurality of data records; generating a first set of hash values, each hash value of the first set of hash values generated by applying a hash function on a data record of the first plurality of data records; receiving a second set of hash values for a second plurality of data records in a second data file stored on a second platform along with a second set of values of the primary key associated with the second set of hash values, each data record of the second plurality of data records comprising the plurality of attributes; comparing the first set of hash values and the second set of hash values according to the first set of values and the second set of values of the primary key; and causing the first data file stored on the first platform or the second data file stored on the second platform to be modified based on the first set of hash values being different from the second set of hash values.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

DETAILED DESCRIPTION

Some aspects of the disclosure relate to secure validation of a large scale sensitive dataset migrated across multiple platforms without revealing the content of the sensitive data. An example of a large-scale dataset can include 200 million data records with each data record having over 500 attributes. The secure data validation process according to some examples presented herein can significantly reduce the computational complexity and network bandwidth consumption of validating the large-scale dataset and improve the security of the process by transmitting and comparing hashed or obfuscated data.

In one example, a source platform can migrate a source data file stored in a source data repository to a destination platform to be stored as a destination data file in a destination data repository. The source data file and the destination data files may include data records that each contains attributes. The source platform and the destination platform may each include a data verification application for verifying that the data in the destination data file and the source data file are the same at a data record level. To verify the data, the data verification applications may transform data in the data files to common data formats. The data verification applications may identify corresponding primary key values for the data records in the data files. The primary key values may be an attribute in the data files. For example, the primary key values may be an attribute or a combination of attributes that has a number of unique values that is equal to the number of data records in the data files. The primary key values may be used to match corresponding data records in the source data file and the destination data file.

The data verification applications may concatenate all attribute values of each data record in the data files to create a single field, and may apply a secure hashing function to the single field to produce a hash value associated with each data record. One of the data verification applications may receive hash values and primary key values from the other platform. The data verification application may identify corresponding pairs of hash values in the source data file and the destination data file by identifying corresponding pairs of primary key values. The data verification application may compare a source hash value to its corresponding destination hash value to determine a difference between the hash values. If there is no difference between the hash values, the verification application may validate the destination data file as being accurate. If there is a difference between the hash values, the verification application may generate an output indicating the discrepancy and the data records containing different hash values. Based on the output, the destination platform can modify the destination data file to resolve the discrepancy. For example, the destination platform may update incorrect data record values or insert missing attributes in the destination data file.

In some examples, the verification applications may generate hash values based on attributes, rather than data records. For example, the verification applications may concatenate multiple data record values of each attribute in the data files to create a single field, and may apply a secure hashing function to the single field to produce a hash value associated with each attribute. Corresponding hash values for the attributes may be compared in the same manner as described above. Additionally, or alternatively, the verification applications may partition the data record values of the attributes into chunks. The verification applications may concatenate the values of each chunk into a single field and may apply a secure hashing function to each chunk to generate chunk hash values. The verification applications may further apply a secure hashing function to the chunk hash values to generate a hash value for the entire attribute. Corresponding hash values for the attributes may be compared in the same manner as described above. If a mis-match is determined between the hash values for the attributes, the verification application may compare the hash values of corresponding chunks in order to identify the location of the mis-match. The verification application may generate output indicating the mis-match, based on which the destination data file can be modified to resolve the mis-match.

As described herein, certain aspects provide improvements to data validation by reducing computational consumption for performing the data validation. Comparing the hash values of the data files may be significantly faster and may consume fewer resources than comparing each data record of a large data transfer. Additionally, transmitting the hash values to be validated rather than the data files themselves may reduce the network bandwidth because the size of the hash values is significantly smaller than the size of the data files. Furthermore, the security may be increased as the data validation involves only transmitting the hash values rather than transmitting the contents of the data records and thus does not reveal the clear text of the data records. This protects the sensitivity of the data.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
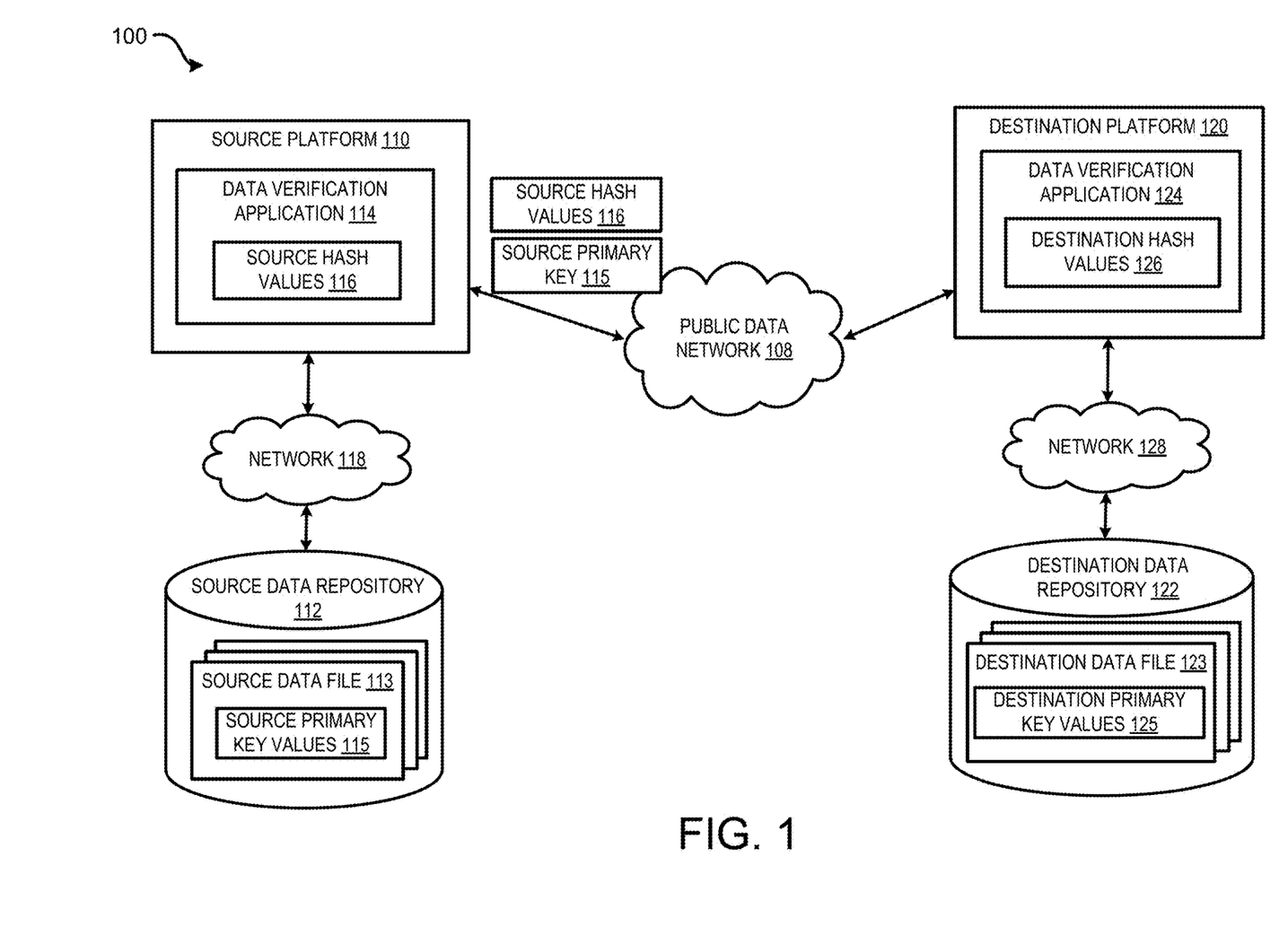
FIG. 1 is a block diagram depicting an example of an operating environment for securely validating a large amount of sensitive data migrated across multiple platforms without revealing the content of the sensitive data, according to certain aspects of the present disclosure.

FIG. 1 is a block diagram depicting an example of an operating environment 100 for securely validating a large amount of sensitive data migrated across multiple platforms without revealing the content of the sensitive data, according to certain aspects of the present disclosure. The operating environment 100 includes a source platform 110 that has access to a source data repository 112, for example, over a network 118. The source platform 110 can be further in communication with a destination platform 120 that has access to a destination data repository 122 over a network 128, for example. The source platform 110 and the destination platform 120 may communicate over a public data network 108.

The network 118 which may be a private network, the network 128 which may also be a private network, and the public data network 108 may each be implemented as one or more data networks. A data network may include one or more of a variety of different types of networks, including a wireless network, a wired network, or a combination of a wired and wireless network. Examples of suitable networks include a local-area network ("LAN"), a wide-area network ("WAN"), a wireless local area network ("WLAN"), the Internet, or any other networking topology known in the art that can connect devices as described herein. A wireless network may include a wireless interface or a combination of wireless interfaces. The wired or wireless networks may be implemented using routers, access points, bridges, gateways, or the like, to connect devices in the operating environment 100.

The source data repository 112 may store one or more source data files 113. Each source data file 113 can include multiple data records, and each data record can include multiple attributes. In some examples, the source data files 113 may be tables, the data records may be table rows, and the attributes may be table columns. In some examples, the source data repository 112 may include large-scale datasets containing large numbers of data records and attributes. For example, the source data files 113 can include 200 million data records with each data record having over 500 attributes. In some examples, the source data files 113 may include sensitive data such as personally identifiable information, payment card industry data, or other highly confidential information. Personally identifiable information may include social security numbers, names, addresses, etc. Payment card industry data may include credit card numbers. Data migration may require the source platform 110 to access the source data files 113 stored in the source data repository 112 and transfer the source data files 113 to be stored as one or more destination data files 123 in the destination data repository 122 associated with the destination platform 120.

To verify the migrated data, the source platform 110 be configured to execute program code, such as a data verification application 114. The program code can be stored on a non-transitory computer-readable storage medium. The data verification application 114 can access the clear text for each data record of the source data files 113 via the network 118 and can determine or assign a source primary key for the data records in the source data file 113. The source primary key values 115 may uniquely identify each data record within the source data files 113. The data verification application 114 can apply a hashing algorithm to the clear text of the data records to generate source hash values 116 for each data record of the source data files 113. For example, the hashing algorithm may be a one-way hashing function such as SHA-256. The data verification application 114 can then transmit the source hash values 116 and the source primary key values 115 to the destination platform 120 via the public data network 108 for use in verifying the data transfer.

The destination platform 120 may use the data verification application 124 to assign destination primary key values 125 to the data records of the destination data files 123 in the same manner as described above. The primary key for each data file can be determined by the source platform, the destination platform, or a third-party system and communicated to the source and destination platforms. The data verification application 124 may apply the same hashing algorithm to clear text of the data records in the destination data files 123 to generate destination hash values 126. The data verification application 124 may use the source primary key values 115 and the destination primary key values 125 to identify corresponding data records in the source data files 113 and the destination data files 123. The data verification application 124 may compare the source hash values 116 and the destination hash values 126 of corresponding data records to identify differences between the source data files 113 and the destination data files 123. Alternatively, the destination platform 120 may transmit the destination hash values 126 and the destination primary key values 125 to the source platform 110, and the source platform 110 may use the data verification application 114 to identify differences between the source data files 113 and the destination data files 123 in the same manner as described above. In other examples, the source platform 110 and the destination platform 120 may transmit the source primary key values 115, the source hash values 116, the destination primary key values 125, and the destination hash values 126 to a third platform for data verification. If the source hash values 116 differ from the destination hash values 126, the destination platform 120 may modify the destination data files 123 based on the differences. For example, the destination platform 120 may insert missing data records, or correct data records with incorrect values.

While FIG. 1 shows that the source data repository 112 and the destination data repository 122 are accessed through respective network, the source data repository 112 and the destination data repository 122 may be network-attached storage units that may store a variety of different types of data organized in a variety of different ways and from a variety of different sources. For example, the network-attached storage units may include storage other than the source data files 113 or destination data files 123 and may be directly accessible by the processors located in the source platform 110 or destination platform 120. In some aspects, the network-attached storage units may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

The number of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the source platform 110 and the source data repository 112, may be instead implemented in a single device or system.

Figure 2:
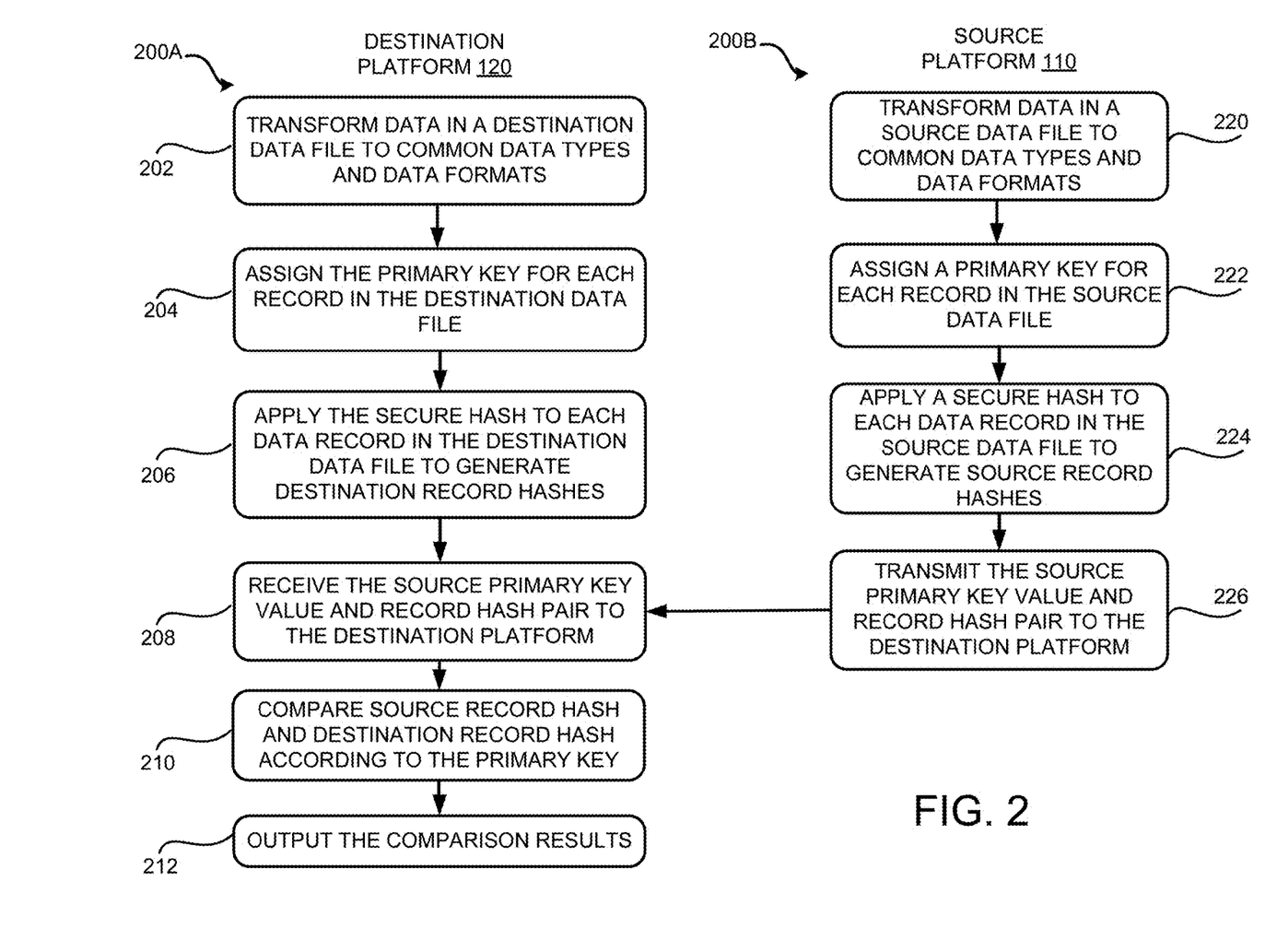
FIG. 2 includes several flow diagrams depicting an example of a process for securely validating a large amount of sensitive data migrated across multiple platforms without revealing the content of the sensitive data, according to certain aspects of the present disclosure.

FIG. 2 includes several flow diagrams depicting an example of a process for securely validating a large amount of sensitive data migrated across multiple platforms without revealing the content of the sensitive data, according to certain aspects of the present disclosure. In particular, the process 200A illustrates aspects of the destination platform 120, and the process 200B illustrates aspects of the source platform 110 with regard to the examples described with respect to FIG. 1. The destination platform 120 and the source platform 110 implement operations depicted in FIG. 2 by executing respective suitable program code (e.g., the data verification application 114 and the data verification application 124). The processes 200A and 200B will be described together below.

At block 202, the process 200A involves transforming, by the destination platform 120, data in a destination data file 123 to common data types and data formats. For example, data in the destination data file 123 and the source data file 113 may each include a date attribute. The source platform 110 and the destination platform 120 may have incompatible date formats for this attribute, and thus the destination platform 120 may transform each date in the destination data file 123 to a common date format such as "mm-dd-yyy."

At block 204, the process 200A involves assigning, by the destination platform 120, a primary key for each data record in the destination data file 123. The value of the primary key (such as the destination primary key values 125 and the source primary key values 115) may uniquely identify corresponding data records in the destination data file 123 and the source data file 113. In some examples, the destination data file 123 and the and the source data file 113 may already have a primary key assigned for the data records, such as a serial number or other types of identifier of the data records. In cases where the data records do not have a primary key, the destination platform 120 may determine or assign the primary key for the data records.

Figure 3:
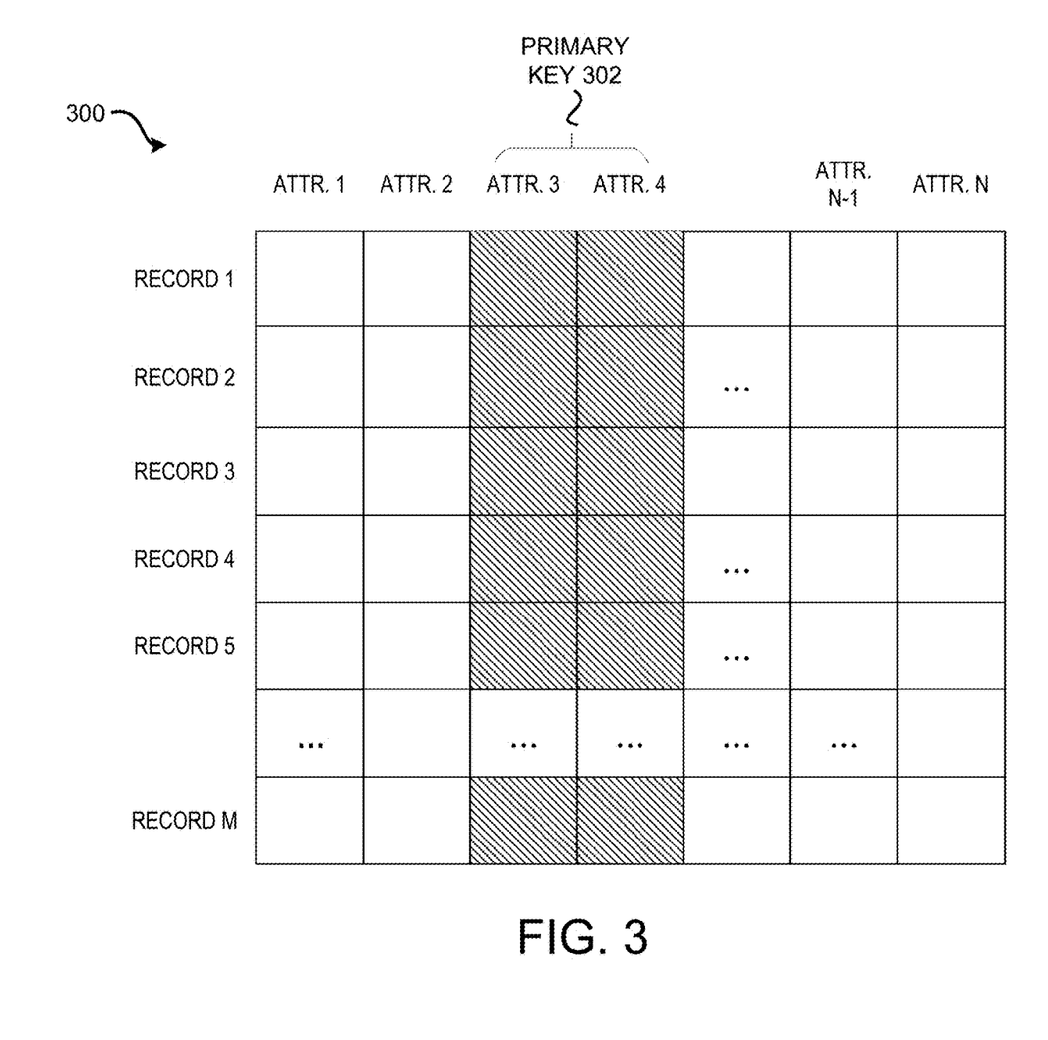
FIG. 3 is a diagram depicting an example of the data file and the primary key of the data file, according to certain aspects of the present disclosure.

FIG. 3 is a diagram depicting an example of a data file 300 and the primary key 302 of the data file 300, according to certain aspects of the present disclosure. While FIG. 3 shows that the data records in a data file 300 are organized as a database table, other types of data structure can be utilized to store data records, such as a linked list, data objects, a programmatic structure, or any other type of data structure. Each data element included in the data file 300 may represent one or more fields or columns of a database table, one or more attributes of an object, one or more member variables of a programmatic structure, or any other unit of data of a data file 300. The implementation is a matter of choice, and may depend on the technology, performance, and other requirements of the computing system upon which the data files 300 are implemented.

Specifically, FIG. 3 shows one example of data records and attributes that may be stored in a data file 300, such as the source data file 113 or the destination data file 123 described above. In this example, the data file 300 comprises M rows representing data records and N columns representing attributes, where M and N are positive integers. In some examples, the data file 300 is a large-scale dataset, for example including 200 million rows and each row having more than 1000 attributes.

To determine a primary key 302 for the data file 300, a system, such as the source platform, the destination platform or a third platform or system, may determine the total number M of data records. The system may determine a column or combination of columns that has M number of unique values. For example, FIG. 3 depicts the columns displaying Attribute 3 and Attribute 4 as having M number of unique values. The primary key 302 may comprise the values in the column or the combination of columns. In some examples, the primary key 302 may include most or all columns of the data file 300.

Figure 4A:
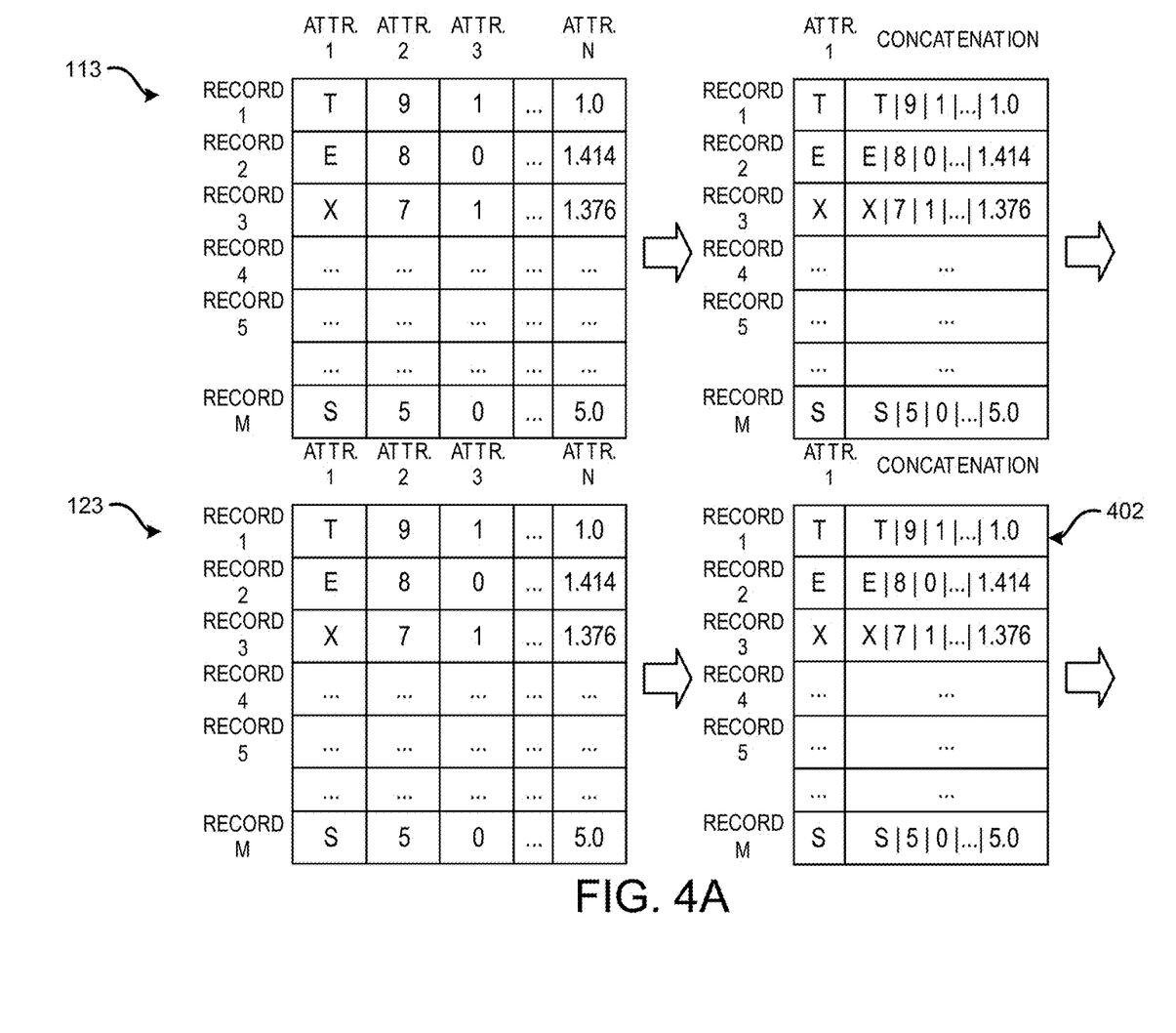
FIGS. 4A and 4B is a diagram depicting an example of a source data file and a destination data file and the generated hash values along with the primary key, according to certain aspects of the present disclosure.
Figure 4B:
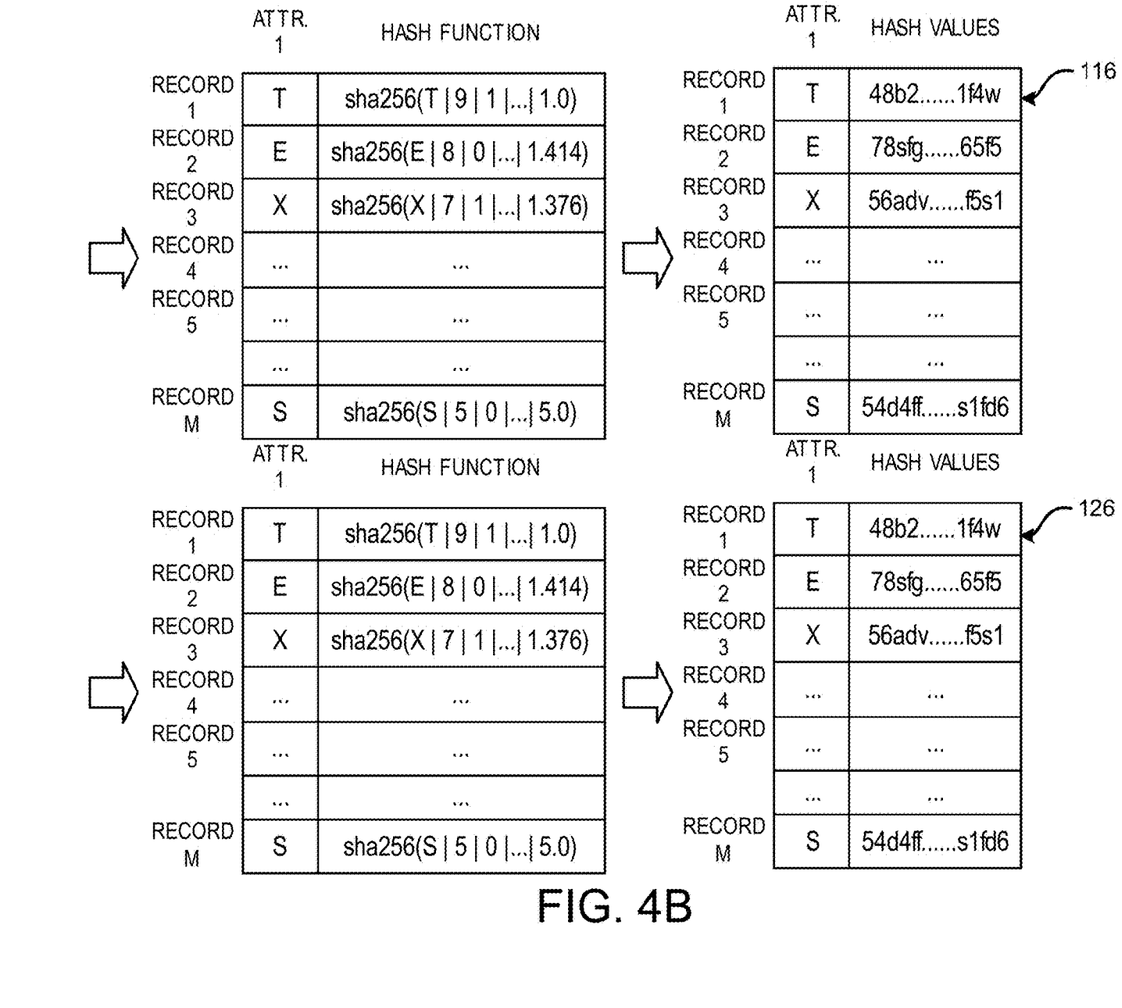

Referring back to FIG. 2, at block 206, the process 200A involves applying, by the destination platform 120, the secure hash to each data record in the destination data file 123 to generate destination hash values 126 for the data records. FIGS. 4A and 4B show an example of generating the hash values. FIG. 4A shows a source data file 113, a destination data file 123 and the generated hash values along with the primary key, according to certain aspects of the present disclosure. The process of generating the destination hash values 126 for the destination data file 123 will be described here, but the same process may be applied to the source data file 113 for generating the source hash values 116 by the source platform 110. While FIGS. 4A and 4B show that that the data records in the source data file 113 and the destination data file 123 are organized as a database table, other types of data structures can be utilized to store data records, such as a linked list, data objects, a programmatic structure, or any other type of data structure. Each data element included in the source data file 113 and the destination data file 123 may represent one or more fields or columns of a database table, one or more attributes of an object, one or more member variables of a programmatic structure, or any other unit of data of a data file. The implementation is a matter of choice, and may depend on the technology, performance, and other requirements of the computing system upon which the source data file 113 and the destination data file 123 are implemented.

Specifically, FIGS. 4A and 4B shows one example of data records and attributes that may be stored in a source data file 113 and a destination data file 123. In this example, the data files include M rows representing data records and N columns representing attributes, where M and N are positive integers. In some examples, the data file 300 is a large-scale dataset, for example including 200 million rows and each row having more than 1000 attributes.

In this example, the primary key is Attribute 1. Thus, the destination primary key values 125 for the destination data file 123 are the values of the column representing Attribute 1 in the destination data file 123, the first column in this example. The destination data file 123 may include M data records with N attributes each. The attributes may have differing formats. For example, Attribute 1 may be a string, Attribute 2 may be an integer, Attribute 3 may be a binary value, and Attribute N may be a double type of value. The destination platform 120 may concatenate the elements of each data record (e.g., row) into a single field 402. For example, the concatenation for Data Record 1 may be "T|9|1| . . . |1.0." The concatenation may be in the same order for each data record, and may not have any field truncation. The destination platform 120 may apply a secure hashing function, such as SHA-256, to the single field to generate a hash value 126 for each data record. The secure hashing function may generate destination hash values 126 for each data record in the destination data file 123.

In some examples, before the hash values are generated, the attributes in the source data file are ordered in the same way as the attributes in the destination data file. For example, as shown in FIG. 4A, the attributes in the source data file 113 and the destination data file 123 are both ordered as Attribute 1 followed by Attribute 2, Attribute 2 followed by Attribute 3, and so on. This allows the hash values generated for corresponding data records in the source file and destination file to match if the respective attribute values are the same. In other words, a mis-match of the hash values can indicate the difference in the attribute values.

Referring back to FIG. 2, at block 220, the process 200B involves transforming, by the source platform 110, data in a source data file 113 to common data types and data formats. Block 220 is similar to block 202. At block 222, the process 200B involves assigning, by the source platform 110, source primary key values 115 for each data record in the source data file 113. Block 222 is similar to block 204. The primary key used by the source platform 110 is the same as the primary key used by the destination platform 120. At block 224, the process 200B involves applying, by the source platform 110, a secure hash to each data record in the source data file 113 to generate source hash values 116. Block 224 is similar to block 206.

At block 226, the process 200B involves transmitting, by the source platform 110, the source primary key values 115 and source hash values 116 to the destination platform 120. In some examples, the source primary key values 115 may be transmitted in clear text. Alternatively, or additionally, the source primary key values 115 may be encrypted text according to an encryption algorithm known to both the source platform 110 and the destination platform 120. At block 208, the process 200A involves receiving, by the destination platform 120, the source primary key values 115 and source hash values 116. At block 210, the process 200A involves comparing, by the destination platform 120, the source hash values 116 and the destination hash values 126 according to the primary key. The destination platform 120 can identify corresponding data records between the source data file 113 and the destination data file 123 by identifying corresponding source primary key values 115 and destination primary key values 125. The destination platform 120 can compare a source hash value 116 and a corresponding destination hash value 126 for each data record. For example, as depicted in FIG. 4, the destination platform 120 can compare the source hash value 116 for the source data file 113 data record 1 of "48b2 . . . 1f4w" with the destination hash value 126 for the destination data file 123 data record 1 of "48b2 . . . 1f4w." If the hash values exactly match, the destination platform 120 may determine that data record 1 has been moved to the destination platform 120 without errors. In other examples, the destination platforms 120 may determine that the hash values do not exactly match and thus the data records for the destination data file 123 include errors.

At block 212, the process 200A involves outputting, by the destination platform 120, the comparison results. The comparison results may include hash values matching or mis-matching. Mis-matching hash values may indicate differences between particular corresponding data records in the source data file 113 and the destination data file 123. If the comparison results include mis-matching hash values, the destination platform 120 may modify the destination data file 123 or have the destination data file 123 modified based on the mis-match. For example, the destination platform 120 may replace an incorrect attribute with a correct attribute. Alternatively, or additionally, data files can be re-transmitted to the destination platform 120. In some examples, the mis-match may be caused by the data files on the source platform 110. In those cases, the source platform 110 may identify the correct data files 113, modify the source data file 113 (or have the source data file 113 modified) based on the mis-match, or both.

Figure 5A:
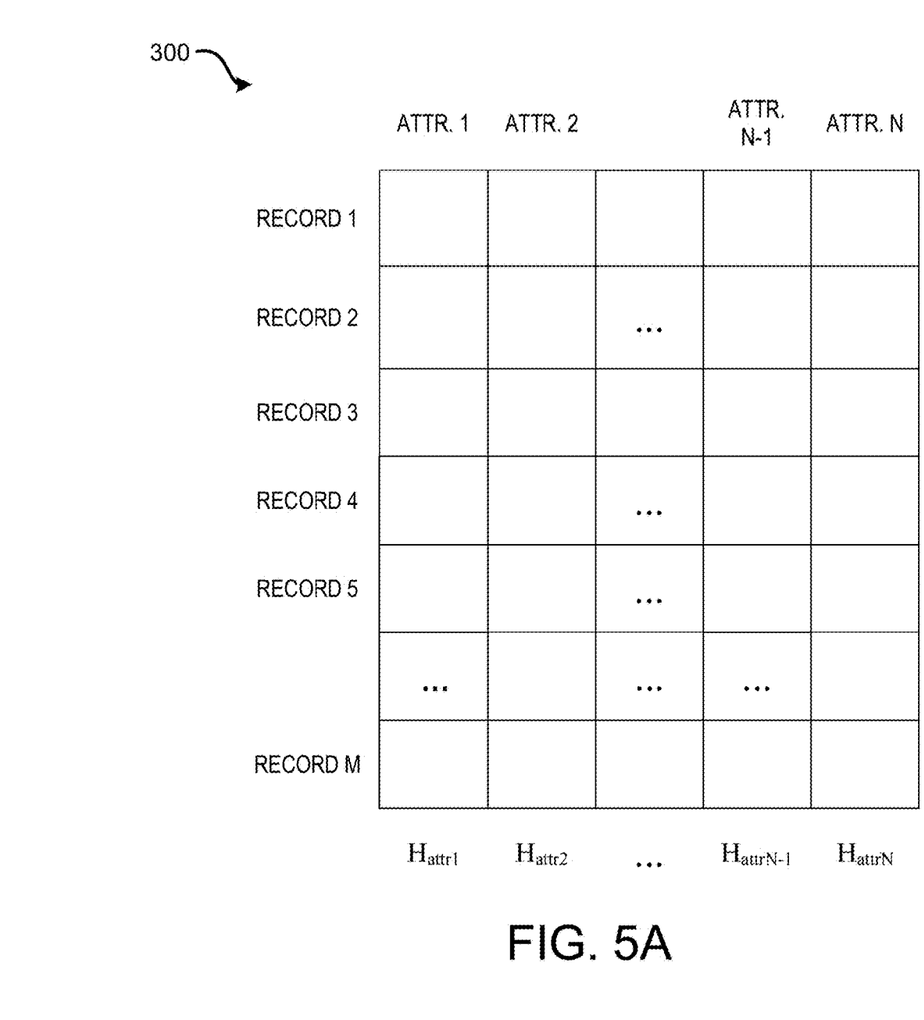
FIG. 5A is a diagram illustrating an example of generating hash values for attributes of a data file, according to certain aspects of the present disclosure.
Figure 5B:
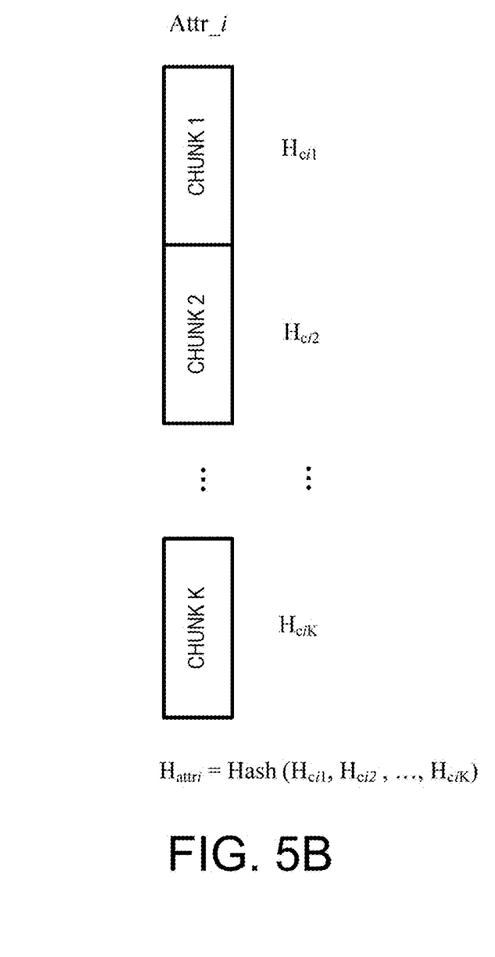
FIG. 5B is a diagram illustrating an example of generating hash values based on chunks of attributes of a data file, according to certain aspects of the present disclosure.

In some examples, the destination data file 123 may have an attribute shifted or missing when compared with the corresponding source data file 113. To detect the attribute shift, hash values can be generated for attributes in addition to or instead of data records. FIGS. 5A and 5B illustrate the generation of attribute based hash values. FIG. 5A is a diagram illustrating an example of generating hash values for attributes of a data file 500, according to certain aspects of the present disclosure. While FIG. 5A shows that the data records in the data file 500 are organized as a database table, other types of data structures can be utilized to store data records, such as a linked list, data objects, a programmatic structure, or any other type of data structure. Each data element included in the data file 500 may represent one or more fields or columns of a database table, one or more attributes of an object, one or more member variables of a programmatic structure, or any other unit of data of a data file 500. The implementation is a matter of choice, and may depend on the technology, performance, and other requirements of the computing system upon which the data files 500 are implemented.

Specifically, FIG. 5A shows one example of data records and attributes that may be stored in a data file 500, such as the source data file 113 or the destination data file 123 described above. In this example, the data file 500 contains M rows representing M data records and N columns representing N attributes, where M and N are positive integers. In some examples, the data file 500 is a large-scale dataset, for example including 200 million rows and each row having more than 1000 attributes. Assuming a column/attribute shift has occurred due to an attribute column in the data file 500 being dropped during the data transfer, each corresponding hash values for a source data file and a destination data file will be mis-matched. To determine the source of the column shift, a system, such as the source platform 110, the destination platform 120, or a third system can compare each attribute column of the source data file and the destination data file. In a similar manner as described above for concatenating rows of data records into single fields and applying a secure hashing function to the single fields to produce hash values, the verification application on the source platform and the destination platform can generate hash values for the attribute columns. For example, the verification application may concatenate the values of Attribute 1 into a single field in order. The verification application may apply a secure hashing function to the single field to generate a column hash value, "$H_{attr1}$." In some examples, the secure hashing function applied to the column single fields may be a same or different secure hashing function applied to the row single fields as described above. The verification application may thus create column hash values $H_{attr1}$-$H_{attrN}$ for each attribute of the data file 500.

In some examples, the data file 500 may include a significantly large number of data records that may be distributedly stored on multiple data storages. In such a scenario, concatenating all the values for an attribute in the same order for the source platform and the destination platform becomes computational expensive and error prone. Therefore, the verification application on the source platform 110 and the destination platform 120 may generate hash values by dividing the values of attributes into chunks.

FIG. 5B is a diagram illustrating an example of generating hash values based on chunks of attributes of a data file 500, according to certain aspects of the present disclosure. The verification application may partition each attribute into chunks of attributes. The partition may be based on the location of the attribute values (e.g., attribute values stored in the same location are put into one chunk), the size of the attribute values (e.g., every 10,000 attribute values are input into one chunk), or both. Partitioning the attributes into chunks can reduce the requirements on the memory and processing power of the processing device(s) on the source platform 110 and the destination platform 120 that are used to generate the hash values. FIG. 5B depicts an Attribute i that is partitioned into K chunks, where K is a positive integer. The verification application may generate a hashed value "$H_{ci}$" for each chunk of the Attribute i in the same manner as described above. The verification application may then generate a hash value "$H_{attri}$" for the entire Attribute i by hashing the hash values for the K chunks. The verification application may compare the hash value for each attribute in the data file 500 with a hash value for each attribute of a source data file. If the verification application determines that there is a mis-match between the attribute hash values in the data file 500 and the source data file, the verification application may compare the chunks in the data file 500 and the chunks in the source data file to determine the source of the mis-match. The verification application may then output the mis-match to be used in a modification of the data file 500 to correct the mis-match.

While the above description focuses on the source platform transmitting the hash values to the destination platform where the comparison of hash values are performed, other implementations can be carried out. For example, the source platform can perform the comparison by receiving the hash values from the destination platform. In another example, a third system or platform can be employed to perform the comparison where both the source platform and the destination platform send the hash values along with the primary key values to the third system. If there is any mis-match among the two sets of hash values, the third system informs the source platform, the destination platform, or both about the mis-matches hash values based on which proper corrections can be made.

In addition, although the above description involves identifying and transmitting values of a primary key for the records, the primary key can be omitted. In other words, the hash values can be used as the primary key for comparison between the source data file and the destination data file.

Example of Computing System for Data Validation Operations

Figure 6:
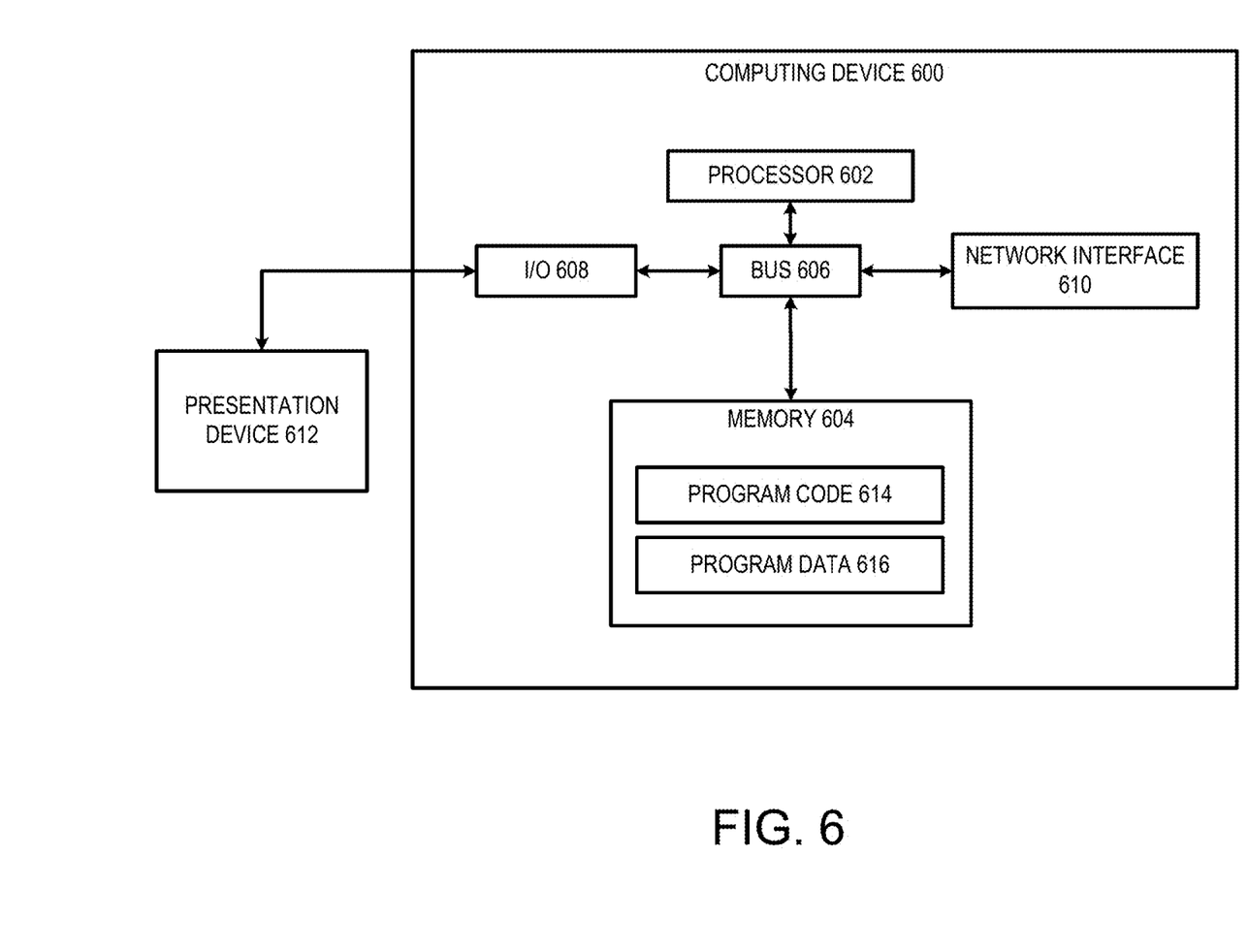
FIG. 6 is a block diagram depicting an example of a computing system suitable for implementing aspects of the techniques and technologies presented herein.

Any suitable computing system or group of computing systems can be used to perform the operations described herein. For example, FIG. 6 is a block diagram depicting an example of a computing device 600, which can be used to implement the source platform 110, the destination platform 120, or any other device for executing the data verification application 114 or the data verification application 124. The computing device 600 can include various devices for communicating with other devices in the operating environment 100, as described with respect to FIG. 1. The computing device 600 can include various devices for performing one or more operations described above with respect to FIGS. 1-5.

The computing device 600 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 600 may also include a number of external or internal devices such as input or output devices. For example, the computing device 600 is shown with an input/output interface 608 that can receive input from input devices or provide output to output devices. A bus 606 can also be included in the computing device 600. The bus 606 can communicatively couple one or more components of the computing device 600.

The computing device 600 can execute program code 614 that includes the data verification application 114 and/or the data verification application 124. The program code 614 for the data verification application 114 and/or the data verification application 124 may be resident in any suitable computer-readable medium and may be executed on any suitable processing device. For example, as depicted in FIG. 6, the program code 614 for the data verification application 114 and/or the data verification application 124 can reside in the memory 604 at the computing device 600 along with the program data 616 associated with the program code 614, such as the source data files 113, source primary key values 115, source hash values 116, destination data files 123, destination primary key values 125, and/or the destination hash values 126. Executing the data verification application 114 and/or the data verification application 124 can configure the processor 602 to perform the operations described herein.

In some aspects, the computing device 600 can include one or more output devices. One example of an output device is the network interface device 610 depicted in FIG. 6. A network interface device 610 can include any device or group of devices suitable for establishing a wired or wireless data connection to one or more data networks described herein. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing device 600 using one or more data networks described herein. In other aspects, the presentation device 612 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A method that includes one or more processing devices performing operations comprising:

transforming data in a first data file stored on a first platform to common data formats, the first data file comprising a first plurality of data records and each data record of the first plurality of data records comprising a plurality of attributes in a first order, wherein the common data formats are associated with data in a second data file stored on a second platform, the second data file comprising a second plurality of data records and each data record of the second plurality of data records comprising the plurality of attributes in a second order;

reordering the data in the first plurality of data records by ordering the data according to the second order of the plurality of attributes based on a determination that the first order of the plurality of attributes differs from the second order of the plurality of attributes;

identifying a first set of values of a primary key for the first plurality of data records;

generating a first set of hash values, each hash value of the first set of hash values generated by applying a hash function on a data record of the first plurality of data records;

receiving a second set of hash values for the second plurality of data records in the second data file stored on the second platform along with a second set of values of the primary key associated with the second set of hash values, each data record of the second plurality of data records comprising the plurality of attributes;

comparing the first set of hash values and the second set of hash values according to the first set of values and the second set of values of the primary key;

determining a location of a mismatch in the first data file stored on the first platform or the second data file stored on the second platform, wherein determining the location of the mismatch comprises:

for each attribute of the plurality of attributes:
partitioning the values in the first plurality of data records for the attribute into multiple chunks,
applying a third hash function on each chunk of each attribute to generate multiple hash values, and
applying a second hash function on each chunk of the multiple chunks to generate a hash value of a third set of hash values, and
comparing the third set of hash values with a fourth set of hash values for the data file to identify the location of the mismatch between first values of the plurality of attributes of the first data file and second values of the plurality of attributes of the second data file; and causing the first data file stored on the first platform or the second data file stored on the second platform to be modified at the location of the mismatch based on the first set of hash values being different from the second set of hash values.

2. The method of claim 1, wherein comparing the first set of hash values and the second set of hash values according to the first set of values and the second set of values of the primary key comprises:

identifying correspondence between a first hash value from the first set of hash values and a second hash value from the second set of hash values based on a value of the primary key associated with the first hash value matches a value of the primary key associated with the second hash value;

comparing the first hash value and the second hash value; and determining that the first set of hash values is different from the second set of hash values based on the first hash value being different the second hash value.

3. The method of claim 1, wherein generating a first set of hash values comprises:

concatenating the plurality of attributes for each data record of the first plurality of data records in a predetermined order to generate a single field for the data record; and applying the hash function on the single field to generate a hash value for the data record.

4. The method of claim 1, wherein the second set of hash values for the second plurality of data records in the second data file are generated by:

transforming data in the second data file to the common data formats;

identifying the second set of values of the primary key for the second plurality of data records; and generating the second set of hash values by applying the hash function on each data record of the second plurality of data records.

5. The method of claim 1, wherein the primary key comprises an additional attribute from the plurality of attributes.

6. The method of claim 1, wherein the operations further comprise determining the primary key for the first data file and the second data file by:

identifying an attribute or a combination of attributes from the plurality of attributes that has a number of unique values being equal to the number of the first plurality of data records.

7. The method of claim 1, wherein the second data file is a source data file and the first data file is a destination data file of the source data file migrated from the second platform to the first platform.

8. The method of claim 1, wherein the operations further comprise:

receiving the fourth set of hash values for the second data file, each hash value of the fourth set of hash values generated by applying the second hash function on values in the second plurality of data records for an attribute of the plurality of attributes.

9. A system comprising:

a processing device; and a memory device in which instructions executable by the processing device are stored for causing the processing device to perform operations comprising:

transforming data in a first data file stored on a first platform to common data formats, the first data file comprising a first plurality of data records and each data record of the first plurality of data records comprising a plurality of attributes in a first order, wherein the common data formats are associated with data in a second data file stored on a second platform, the second data file comprising a second plurality of data records and each data record of the second plurality of data records comprising the plurality of attributes in a second order;

reordering the data in the first plurality of data records by ordering the data according to the second order of the plurality of attributes based on a determination that the first order of the plurality of attributes differs from the second order of the plurality of attributes;

identifying a first set of values of a primary key for the first plurality of data records;

generating a first set of hash values, each hash value of the first set of hash values generated by applying a hash function on a data record of the first plurality of data records;

receiving a second set of hash values for the second plurality of data records in the second data file stored on the second platform along with a second set of values of the primary key associated with the second set of hash values, each data record of the second plurality of data records comprising the plurality of attributes;

comparing the first set of hash values and the second set of hash values according to the first set of values and the second set of values of the primary key;

determining a location of a mismatch in the first data file stored on the first platform or the second data file stored on the second platform, wherein determining the location of the mismatch comprises:

for each attribute of the plurality of attributes:
partitioning the values in the first plurality of data records for the attribute into multiple chunks,
applying a third hash function on each chunk of each attribute to generate multiple hash values, and
applying a second hash function on each chunk of the multiple chunks to generate a hash value of a third set of hash values; and comparing the third set of hash values with a fourth set of hash values for the data file to identify the location of the mismatch between first values of the plurality of attributes of the first data file and second values of the plurality of attributes of the second data file; and causing the first data file stored on the first platform or the second data file stored on the second platform to be modified at the location of the mismatch based on the first set of hash values being different from the second set of hash values.

10. The system of claim 9, wherein comparing the first set of hash values and the second set of hash values according to the first set of values and the second set of values of the primary key comprises:

identifying correspondence between a first hash value from the first set of hash values and a second hash value from the second set of hash values based on a value of the primary key associated with the first hash value matches a value of the primary key associated with the second hash value;

comparing the first hash value and the second hash value; and determining that the first set of hash values is different from the second set of hash values based on the first hash value being different the second hash value.

11. The system of claim 9, wherein generating a first set of hash values comprises:

concatenating the plurality of attributes for each data record of the first plurality of data records in a predetermined order to generate a single field for the data record; and applying the hash function on the single field to generate a hash value for the data record.

12. The system of claim 9, wherein the second set of hash values for the second plurality of data records in the second data file are generated by:

transforming data in the second data file to the common data formats;

identifying the second set of values of the primary key for the second plurality of data records; and generating the second set of hash values by applying the hash function on each data record of the second plurality of data records.

13. The system of claim 9, wherein the primary key comprises an additional attribute from the plurality of attributes.

14. The system of claim 9, wherein the operations further comprise determining the primary key for the first data file and the second data file by:

identifying an attribute or a combination of attributes from the plurality of attributes that has a number of unique values being equal to the number of the first plurality of data records.

15. A non-transitory computer-readable storage medium having program code that is executable by a processor device to cause a computing device to perform operations, the operations comprising:

transforming data in a first data file stored on a first platform to common data formats, the first data file comprising a first plurality of data records and each data record of the first plurality of data records comprising a plurality of attributes in a first order, wherein the common data formats are associated with data in a second data file stored on a second platform, the second data file comprising a second plurality of data records and each data record of the second plurality of data records comprising the plurality of attributes in a second order;

reordering the data in the first plurality of data records by ordering the data according to the second order of the plurality of attributes based on a determination that the first order of the plurality of attributes differs from the second order of the plurality of attributes;

identifying a first set of values of a primary key for the first plurality of data records;

generating a first set of hash values, each hash value of the first set of hash values generated by applying a hash function on a data record of the first plurality of data records;

receiving a second set of hash values for the second plurality of data records in the second data file stored on the second platform along with a second set of values of the primary key associated with the second set of hash values, each data record of the second plurality of data records comprising the plurality of attributes;

comparing the first set of hash values and the second set of hash values according to the first set of values and the second set of values of the primary key;

determining a location of a mismatch in the first data file stored on the first platform or the second data file stored on the second platform, wherein determining the location of the mismatch comprises:

for each attribute of the plurality of attributes:
partitioning the values in the first plurality of data records for the attribute into multiple chunks,
applying a third hash function on each chunk of each attribute to generate multiple hash values, and
applying a second hash function on each chunk of the multiple chunks to generate a hash value of a third set of hash values; and comparing the third set of hash values with a fourth set of hash values for the data file to identify the location of the mismatch between first values of the plurality of attributes of the first data file and second values of the plurality of attributes of the second data file; and causing the first data file stored on the first platform or the second data file stored on the second platform to be modified at the location of the mismatch based on the first set of hash values being different from the second set of hash values.

16. The non-transitory computer-readable storage medium of claim 15, wherein comparing the first set of hash values and the second set of hash values according to the first set of values and the second set of values of the primary key comprises:

identifying correspondence between a first hash value from the first set of hash values and a second hash value from the second set of hash values based on a value of the primary key associated with the first hash value matches a value of the primary key associated with the second hash value;

comparing the first hash value and the second hash value; and determining that the first set of hash values is different from the second set of hash values based on the first hash value being different the second hash value.

17. The non-transitory computer-readable storage medium of claim 15, wherein generating a first set of hash values comprises:

concatenating the plurality of attributes for each data record of the first plurality of data records in a predetermined order to generate a single field for the data record; and applying the hash function on the single field to generate a hash value for the data record.

18. The non-transitory computer-readable storage medium of claim 15, wherein the second set of hash values for the second plurality of data records in the second data file are generated by:

transforming data in the second data file to the common data formats;

identifying the second set of values of the primary key for the second plurality of data records; and generating the second set of hash values by applying the hash function on each data record of the second plurality of data records.

19. The non-transitory computer-readable storage medium of claim 15, wherein the primary key comprises an additional attribute from the plurality of attributes.

* * * * *